(12) United States Patent
Narabu

(10) Patent No.: US 6,917,385 B1
(45) Date of Patent: Jul. 12, 2005

(54) IMAGE INPUT DEVICE FOR OBTAINING 2-D AND 3-D IMAGES WITH A LINEAR SENSOR

(75) Inventor: Tadakuni Narabu, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/283,233

(22) Filed: Apr. 1, 1999

(30) Foreign Application Priority Data

Apr. 3, 1998 (JP) ......................................... P10-091078

(51) Int. Cl.[7] .............................................. H04N 5/225
(52) U.S. Cl. ...................... 348/340; 348/203; 359/212
(58) Field of Search ....................... 348/209.99, 210.99, 348/266, 202, 203, 205, 332, 335, 340, 79, 80; 359/197, 198, 200, 205, 211, 212, 214, 215, 216, 217, 225, 226

(56) References Cited

U.S. PATENT DOCUMENTS

| | | | | |
|---|---|---|---|---|
| 3,137,532 A | * | 6/1964 | Tyll ............................. | 312/29 |
| 5,289,265 A | * | 2/1994 | Inoue et al. ................. | 356/632 |
| 5,625,183 A | | 4/1997 | Kashitani et al. | |
| 5,668,631 A | * | 9/1997 | Norita et al. ................ | 356/376 |
| 5,671,080 A | * | 9/1997 | Mihara ........................ | 359/212 |
| 5,748,236 A | * | 5/1998 | Shibazaki .................... | 348/270 |
| 5,757,518 A | | 5/1998 | Kashitani | |
| 5,818,546 A | * | 10/1998 | Opower et al. ............. | 348/750 |
| 5,993,077 A | * | 11/1999 | Jones .......................... | 396/428 |
| 6,141,043 A | * | 10/2000 | Suzuki et al. .......... | 348/211.99 |
| 6,426,776 B1 | * | 7/2002 | Ochi ........................... | 348/370 |
| 6,462,772 B1 | * | 10/2002 | Bryant ........................ | 348/96 |
| 6,657,750 B1 | * | 12/2003 | Ando .......................... | 358/474 |
| 2003/0043351 A1 | * | 3/2003 | Ochi et al. ..................... | 355/18 |
| 2003/0117659 A1 | * | 6/2003 | Ochiai ........................ | 358/302 |
| 2003/0183746 A1 | * | 10/2003 | Chen .......................... | 250/208.1 |
| 2004/0051924 A1 | * | 3/2004 | Lizuka ........................ | 359/205 |
| 2004/0057099 A1 | * | 3/2004 | Kim ............................ | 359/216 |

FOREIGN PATENT DOCUMENTS

| | | |
|---|---|---|
| JP | 63-37772 | 2/1988 |
| JP | 1-93258 | 4/1989 |
| JP | 4-203915 | 7/1992 |
| JP | 6-197250 | 7/1994 |
| JP | 8-70407 | 3/1996 |

* cited by examiner

*Primary Examiner*—Wendy R. Garber
*Assistant Examiner*—Jacqueline Wilson
(74) *Attorney, Agent, or Firm*—Rader, Fishman & Grauer, PLLC; Ronald P. Kananen

(57) ABSTRACT

An image input device comprises a mirror body which is designed in a polygonal prism form and has side peripheral surfaces each formed of a mirror face, image pickup light from a subject being reflected from the mirror face, and a linear sensor for talking the image pickup light reflected from each mirror face of the mirror body to perform photoelectric conversion on the image pickup light. The mirror body is arranged so that the length direction thereof is substantially parallel to the length direction of the linear sensor, and disposed so as to be rotatable around a shaft at the center of the bottom surface which are substantially perpendicular to the length direction of the mirror body.

11 Claims, 7 Drawing Sheets

IMAGE INPUT DEVICE FOR OBTAINING 2-D AND 3-D IMAGES WITH A LINEAR SENSOR

BACKGROUND OF THE INVENTION

The present invention relates to an image input device to obtain a three-dimensional image by using a linear sensor.

The following two types of image input devices have been hitherto generally known as an image input device to obtain a two-dimensional image by using a linear sensor. One type is an image scanner which is being remarkably popular at present. The other type is a device in which a linear sensor is disposed on a film face of a silver chloride camera using middle-size or large-size films and then the linear sensor is moved along the film face to obtain a two-dimensional image (hereinafter referred to as "linear sensor scan camera"). As compared with an image input device for obtaining a two-dimensional image by using an area sensor, both the above devices have an advantage that a two-dimensional image of ultra-high resolution can be obtained.

However, in the conventional image input devices, in the case of the former image scanner, the positional relationship between a subject and an image scanner is substantially fixed, and thus there is no degree of freedom in distance between the subject and the image scanner. Further, in the case of the latter linear sensor scanner camera, the severe mechanical precision is required to move the linear sensor, so that it needs much time and effort to manufacture a precise moving mechanism and the cost is increased. In addition, since the speed at which the linear sensor is moved is low, there is such a drawback that it takes much time to input a two-dimensional image.

Accordingly, in any system described above, at present situation it is difficult to convert a three-dimensional space to a two-dimensional image by using a linear sensor. From such a situation,. it is practically difficult to obtain a two-dimensional moving picture by using a linear sensor.

Further, since the linear sensor is designed like a line, the accumulation time of image pickup information of one scan is shorter than that of the area sensor. As a result, even when the subject is exposed to the same light, an image obtained is darker as compared with an image input device using a linear sensor. Accordingly, from this viewpoint, it is difficult to convert the three-dimensional space to the two-dimensional image under such an environment as night or rainy situation which lacks light amount.

SUMMARY OF THE INVENTION

Therefore, in order to solve the above problem, an image input device according to a first aspect of the present invention, includes: mirror body which is designed in a polygonal prism form and formed of mirror faces on the side peripheral surfaces thereof to reflect image pickup light from a subject at the mirror faces; and a linear sensor for taking the image pickup light reflected from each mirror face of the mirror body and subjecting the image pickup light to photoelectric conversion, wherein the mirror body is disposed so that the length direction thereof is substantially parallel to the length direction of the linear sensor, and provided so as to be rotatable around the center of the plane which is substantially perpendicular to the length direction of the mirror body.

Further, an image input device according to a second aspect of the present invention includes: a housing having a slender incidence window to pass image pickup light from a subject therethrough into the housing; a mirror body which has mirror faces for reflecting the image pickup light from the incidence window and rotatably or swingably provided in the housing; a linear sensor which is disposed in the housing and takes the image pickup light reflected from the mirror body to subject the image pickup light to photoelectric conversion; and a plurality of illuminators which are provided in the housing and successively turned on to light up to the subject.

According to the first aspect of the present invention, when the mirror body is rotated for image input, image pickup light is taken into the linear sensor so that the direction of the light component incident from the subject to the mirror face varies continuously. Therefore, although the arrangement positions of the mirror body and the linear sensor are fixed, there can be obtained image pickup light which would be obtained as if the linear sensor scans the subject, that is, two-dimensional image information.

Further, the positional relationship between the subject and the image input device is not fixed, and some degree of freedom may be provided to the distance therebetween.

Since the rotating mirror body has a polygonal prism form, after image pickup image reflected from a mirror face is obtained, image pickup light in which the direction of the light component incident to a mirror face varies continuously is subsequently obtained by an adjacent mirror face as in the case of the previous mirror face. Accordingly, if the subject is still, the two-dimensional image information of the same subject can be repetitively obtained. Further, if the subject has a motion, two-dimensional image information having continuous motions of the subject can be obtained.

According to the second aspect of the present invention, when the mirror body is rotated or swung for image input, there can be obtained information of a two-dimensional image of image pickup light obtained as if the linear sensor scans the subject. If the subject is still, the two-dimensional image information of the same subject can be repetitively obtained. If the subject has a motion, two-dimensional image information having continuous motions of the subject can be obtained. Further, since plural illuminators which are successively turned on to light up to the subject are provided in the housing in which the mirror body and the linear sensor are accommodated, the subject can be exposed to substantially uniform light during one scan period by successively turning on the illuminators when image pickup light (of one scan) reflected from a mirror face is obtained. Therefore, the image pickup light having a large accumulation amount can be obtained even by a linear sensor having a shorter accumulation time of image pickup light to be taken per scan as compared with the area sensor.

BRIEF DESCRIPTION OF DRAWINGS

FIGS. 4A and 4B are front views showing a second embodiment of the image input device according to the present invention, wherein FIG. 4A shows a state where support legs are retracted in a housing, and FIG. 4B shows a state where the support legs are expanded;

DETAILED DESCRIPTION OF THE PREFERRED EMBODIMENTS

Preferred embodiments of an image input device according to the present invention will be described with reference to the accompanying drawings.

Figure 1:
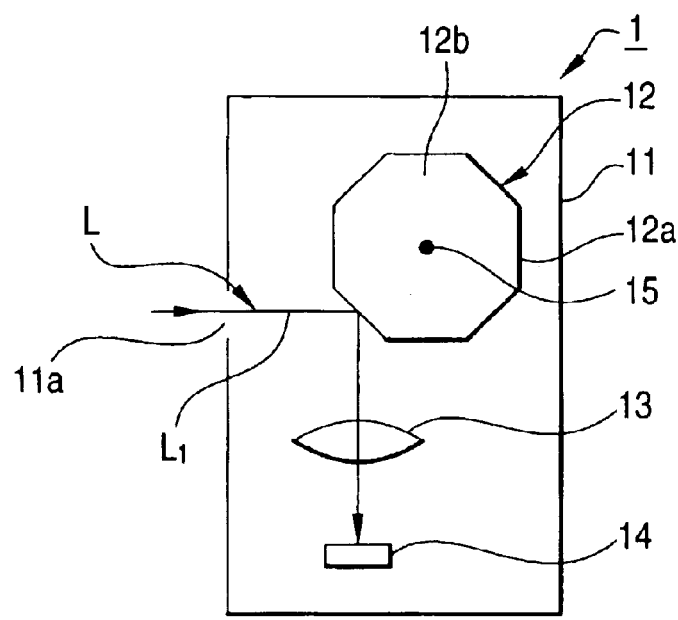
FIG. 1 is a diagram showing the construction of a first embodiment of an image input device according to the present invention.
Figure 2:
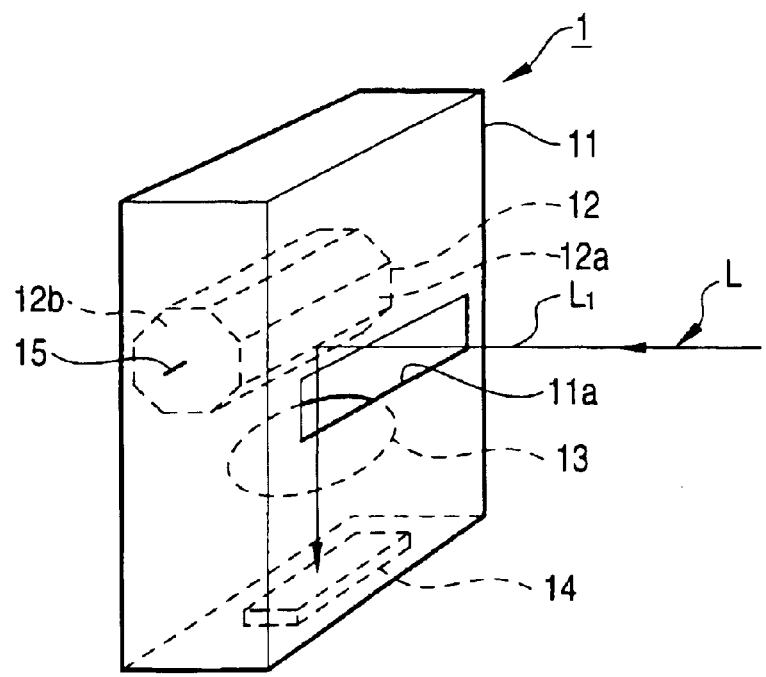
FIG. 2 is a perspective view showing the first embodiment of the image input device according to the present invention.

FIG. 1 is a schematic diagram showing the construction of a first embodiment of an image input device according to the present invention, and FIG. 2 is a perspective view showing the first embodiment of the image input device according to the present invention.

An image input device 1 shown in FIG. 1 is designed so that a mirror body 12, a lens 13 and a linear sensor 14 are provided in a housing 11. The housing 11 is formed of a light shielding material. It is designed in a rectangular parallelepiped shape, for example, and is provided at one surface thereof with a slender incidence window 11a for passing image pickup light L from the subject therethrough into the inside of the housing 11. As described later, the incidence window 11a is formed so that the length direction thereof is substantially parallel to the length direction of the mirror body 12.

The mirror body 12 is designed in a polygonal prism form, and all the side peripheral surfaces 12a thereof are formed of mirror faces (hereinafter the side peripheral surface 12a is referred to as the mirror face 12a). The mirror body 12 is disposed in the housing 11 so that the length direction thereof is substantially parallel to the length direction of the linear sensor and the image pickup light L from the incidence window 11a is reflected from the mirror face 12a. FIGS. 1 and 2 show a case where the mirror body 12 has a polygonal prism form and each mirror face 12a is flat.

The center of the plane which is substantially perpendicular to the length direction of the mirror body 12, that is, the substantial centers of the bottom surfaces 12b at both sides of the side peripheral surfaces 12a of the mirror body 12 are supported by a shaft 15 so as to be rotatable in the housing 11 and thus the mirror body 12 autorotates around the shaft 15. Further, a first driving circuit (not shown) for rotating the mirror body 12 is connected to the mirror body 12.

The lens 13 projects the image pickup light L onto the linear sensor 14. In this embodiment, it is fixedly disposed between the mirror body 12 and the linear sensor 14 so as to project the image pickup light L reflected from the mirror face 12a of the mirror body 12 onto the linear sensor 14.

The linear sensor 14 has a function of taking the image pickup light L reflected from the mirror body 12 to subject it to photoelectric conversion and. outputting electrical signals thus obtained as video signals (image pickup information). As the linear sensor 14, a semiconductor image pickup device such as an MOS (metal oxide semiconductor) type sensor, a CCD (charge coupled device) type sensor or the like may be used.

A white-and-black sensor or a color sensor may be used as the linear sensor 14 using such a semiconductor image pickup device, and a coloring system using a combination of an external color-filter and a white-and-black sensor may be used. As the color sensor, a 3-line color linear sensor, a dot-sequential type color linear sensor, a multi-line color linear sensor, a TDI type linear sensor or the like may be used.

Further, a peripheral circuit for driving the linear sensor 14, a signal processing circuit for performing signal processing of image pickup information output from the linear sensor 14, a timing signal generating circuit for outputting a timing signal to the first driving circuit of the mirror body 12 and the peripheral circuit of the linear sensor 14, etc., which are not shown in the figure, are provided in the housing 11 in which the mirror body 12, the lens and the linear sensor 14 are accommodated.

In the image input device 1 thus constructed, the image pickup light L from the subject is incident from the incidence window 12 of the housing 11, reflected from the mirror surface 12a of the mirror body 12, passed through the lens 13 and then projected onto and taken into the linear sensor 14. At this time, when the mirror body 12 is rotated, the image pickup light L is taken into the linear sensor 14 so that the direction of the light component $L_1$ incident from the subject to the mirror face 12a is continuously varied because the arrangement positions of the mirror body 12, the lens 13 and the linear sensor 14 are fixed. As a result, the image pickup light obtained as if the linear sensor 14 scans the subject, that is, the two-dimensional image information can be obtained.

Accordingly, it is unnecessary to provide a precise moving mechanism for moving the linear sensor 14 like a conventional linear scan camera, and thus a two-dimensional image can be obtained at a low cost as compared with the conventional linear scan camera. Further, in the image input device of the first embodiment, since the linear sensor 14 may be arranged so as to take the image pickup light L projected onto the linear sensor 14, the image pickup information can be obtained with no effect even when the precision of the arrangement position of the linear sensor 14 is low as compared with the conventional linear scan camera. Therefore, the manufacturing work is very easy and thus the productivity can be enhanced.

Further, since it is unnecessary to move the linear sensor 14 and the mirror body 12 is merely autorotated, the housing 11 can be designed in a small size and image pickup information can be input in a short time. In addition, as compared with the conventional linear scan camera which moves the linear sensor 14, the power consumption can be more reduced. Further, since the positional relationship between the subject and the image input device 1 is not fixed, but some degree of freedom is provided to the distance therebetween, two-dimensional image information can be obtained by targeting a three-dimensional space as a subject. The positional relationship between the subject and the image input device 1 is not fixed and the housing 11 can be miniaturized, so that a portable image input device 1 can be designed.

Still further, since the mirror body 12 has a polygonal prism form, after image pickup light L reflected from a mirror face 12a is obtained, a subsequent adjacent mirror face 12a provides image pickup light L in which the direction of the light component $L_1$ incident to the mirror face 12A continuously varies as in the case of the previous face mirror 12a. In addition, there is used a linear sensor 14 which can provide an image having a higher resolution as compared with an image input device using an area sensor, that is, a so-called digital camera. Accordingly, if the subject is still, the two-dimensional information of the same subject is repetitively taken into the linear sensor 14, so that a higher resolution still image can be obtained.

Therefore, a two-dimensional image having the same level image quality can be obtained at a still lower cost than a conventional digital camera using an area sensor which must be manufactured at a high cost because a large number of pixels are needed to obtain an ultra-high resolution image. Further, if the image input device 1 is manufactured substantially at the same cost as the digital camera using the area sensor, a higher-resolution image can be obtained. If the subject has a motion, two-dimensional image information having continuous motions of the subject can be obtained. Therefore, the moving picture of the two-dimensional image can be obtained.

Figure 3:
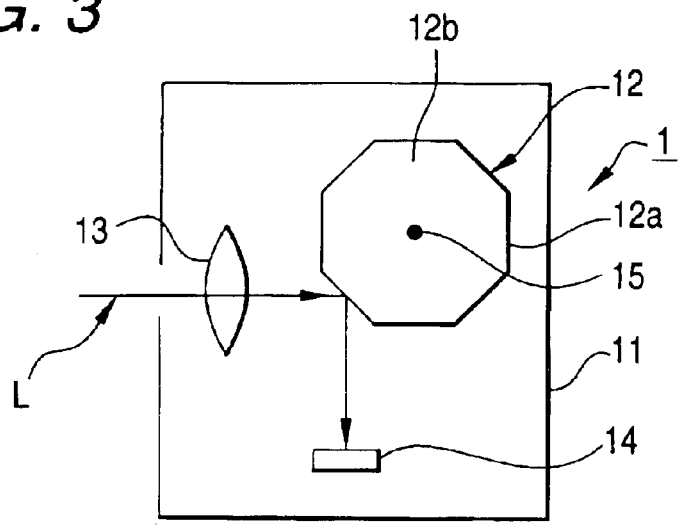
FIG. 3 is a diagram showing the construction of a modification of the first embodiment.

In the above first embodiment, the lens 13 is provided between the mirror body 12 and the linear sensor 14. However, as a modification shown in FIG. 3, the lens 13 may be provided between the incidence window 11a and the mirror body 12 so that the image pickup light L from the subject is incident to the mirror face 12a of the mirror body 12 through the lens 13.

In the above first embodiment, the mirror body is designed in an octagonal prism form. However, the shape of the mirror body is not limited to the above embodiment. For example, the mirror body is designed in a polygonal prism form under the condition that the intersecting angle between adjacent mirror faces is set to a predetermined value in consideration of functions such as optical correction, etc.

Further, in the foregoing description, each mirror face of the mirror body is flat. However, each mirror face may be curved in consideration of correction elements such as optical correction, etc. If the optical correction, etc. are carried out by using the shape of the mirror body, no correction circuit is needed to perform the optical correction, so that the image input device can be further miniaturized and the productivity can be further enhanced. Further, when the optical correction, etc. can be performed on the basis of the intersecting angle between the adjacent mirror faces although each mirror face of the mirror body is flat, or when no optical correction is needed, the manufacturing cost of the mirror body can be reduced.

Figure 4A:
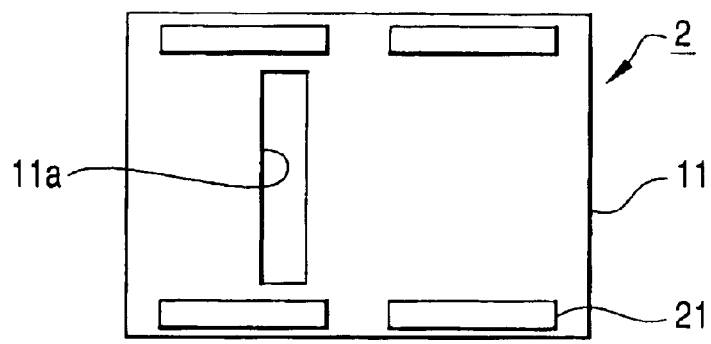
Figure 4B:
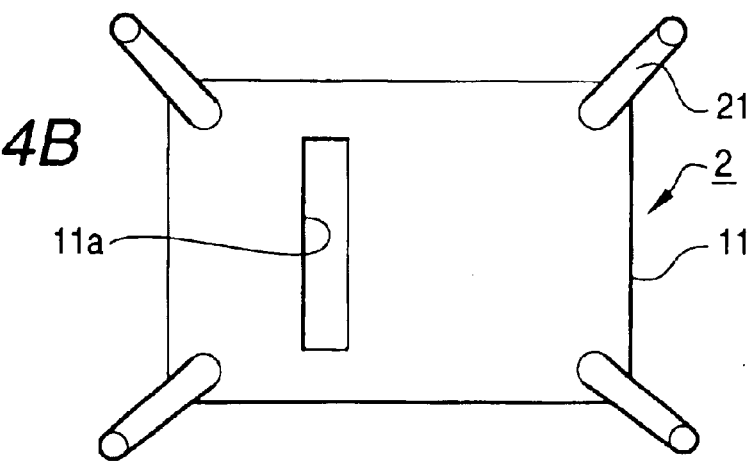
Figure 5:
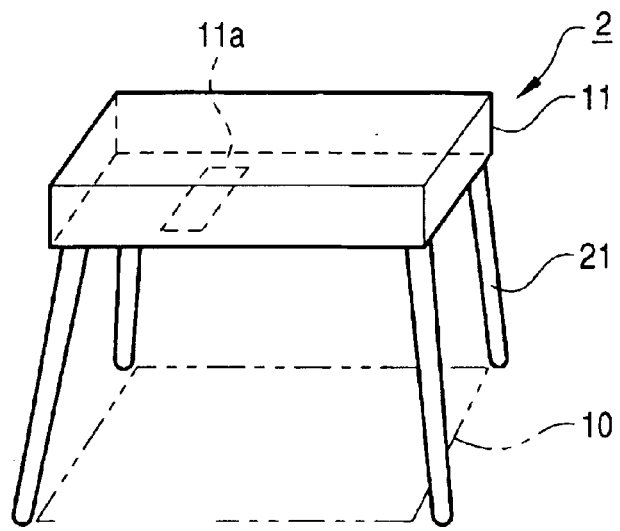
FIG. 5 is a perspective view showing a second embodiment of the image input device according to the present invention.

Next, a second embodiment of the image input device according to the present invention will be described with reference to FIGS. 4A, 4B and FIG. 5. In FIGS. 4A, 4B and 5, the same elements as the first embodiment are represented by the same reference numerals, and the description thereof is omitted.

The difference of the image input device 2 of the second embodiment from the first embodiment resides in that support legs 21 which is expandable from the housing 11 to the outside to support the housing 11 are provided on one surface of the housing 11 on which the incidence window 11a is formed. In the second embodiment, the support legs 21 are designed in a rod form, and they are provided at four corners on one surface of the housing 11 on which the incidence window 11a is formed, for example. Further, as shown in FIG. 4A, they are provided so as to be retractable into the housing 11. Each of the four support legs 21 is designed to expand and contract.

In the image input device 2 described above, as shown in FIG. 5, the support legs 21 are expanded from the housing 11, and the housing 11 is arranged through the support legs 21 on a table (not shown) so that the incidence window 11a of the housing 11 faces the subject 10 such as an original, a photograph or the like which is put on the table.

Accordingly, as in the case of the first embodiment, the image pickup light L from the subject 10 is taken into the linear sensor 14 through the incidence window 11a, the mirror face 12a of the mirror body 12 and the lens 13 while the mirror body 12 in the housing 11 is rotated (see FIG. 1), or the image pickup light L is taken into the linear sensor 14 through the incidence window 11a, the lens 13 and the mirror face 12a of the mirror body 12 (see FIG. 3), and the image pickup light L thus taken is converted to a video signal, thereby obtaining image pickup information of the subject 10 such as an original, a photograph or the like. That is, the image input device functions as a so-called image scanner.

Further, after the image input operation, the support legs 21 can be retracted into the housing 11, and they are put together in compact size, thereby facilitating portability of the device. Further, the degree of freedom is provided to the distance between the subject and the image input device 1 by retracting the support legs 21 into the housing 11 as in the case of the image input device 1 of the first embodiment, and thus two-dimensional image information can be obtained by targeting a three-dimensional space as a subject. Therefore, the image input device 2 of the second embodiment has a function as a portable image scanner and a function of obtaining a two-dimensional still image or moving picture by targeting a three-dimensional space as a subject.

In the second embodiment, the support legs are retractable into the housing, however, they may be detachably mounted to the housing. Further, the rod-shaped support legs are respectively mounted at the four corners. However, any mounting manner may be used insofar as the support legs are provided to the housing so that the housing can be stably supported and the image input operation is not disturbed. For example, three rod-shaped support legs may be provided, or two inverted T-shaped support legs are disposed so as to face each other.

Figure 6:
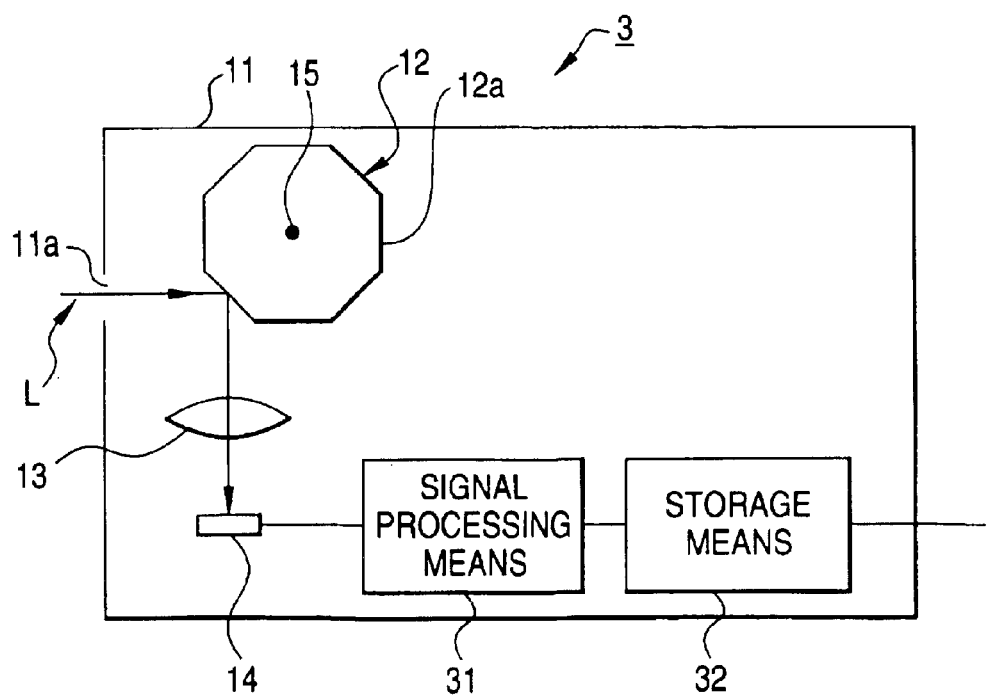
FIG. 6 is a diagram showing the construction of a third embodiment of the image input device according to the present invention.

Next, a third embodiment of the image input device according to the present invention will be described with reference to FIG. 6. In FIG. 6, the same elements as the first embodiment of FIG. 6 are represented by the same reference numerals, and the description thereof is omitted.

The difference of the image input device 3 of the third embodiment from the first embodiment resides in that storage means 32 for storing image pickup information output from the linear sensor 14 is provided in the housing 11 while it is connected to the linear sensor 14. Further, in this embodiment, signal processing means 31 comprising a signal processing circuit for subjecting the image pickup information from the linear sensor 14 to predetermined signal processing is provided between the linear sensor 14 and the storage means 32, and the image pickup information which is subjected to the signal processing in the signal processing means 31 is stored in the storage means 32. As the storage means 32 is used a semiconductor memory such as RAM or the like, a floppy disk, MO (magnet optical) disk, a magnetic tape, a compact disk or the like.

The image input device 3 as described above is provided with the storage means 32, and thus a large amount of image pickup information can be accumulated. Therefore, when two-dimensional moving pictures are obtained, the output from the linear sensor 14 can be accumulated in the storage means 32 every mirror face 12a of the mirror body 12 (every scan), and thus the image input device is very effective. Further, the image pickup information thus accumulated is corrected on the time axis and output from the storage means 32 to a monitor to display two-dimensional moving pictures on the monitor. If the rotating timing of the mirror body 12 can be controlled so that it is unnecessary to correct the time axis for the image pickup information output from the linear sensor 14 when moving pictures are obtained, the storage means 32 may be omitted.

Figure 7:
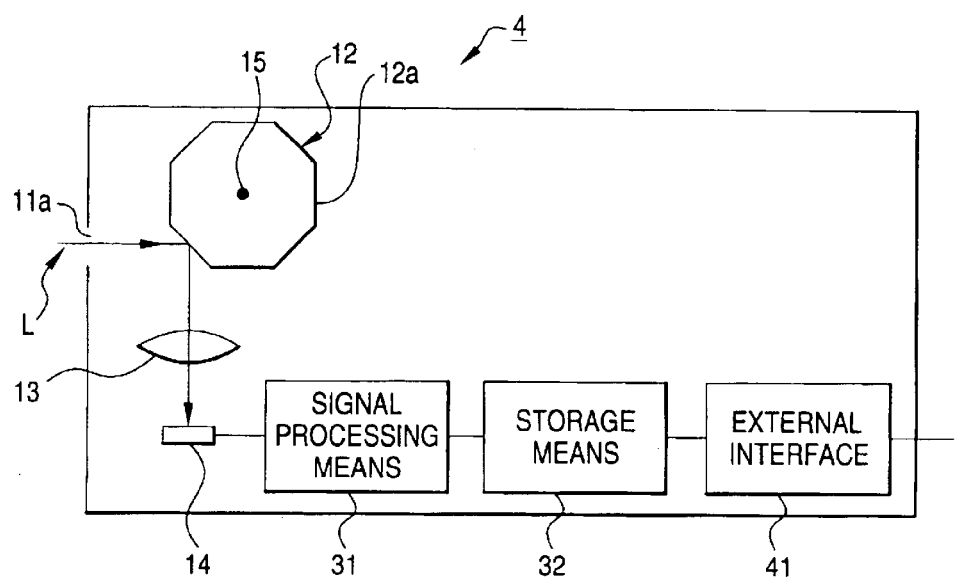
FIG. 7 is a diagram showing the construction of a fourth embodiment of the image input device according to the present invention.

A fourth embodiment of the image input device according to the present invention will be described with reference to FIG. 7. In FIG. 7, the same elements as the third embodiment are represented by the same reference numerals, and the description thereof is omitted.

The difference of the image input device 4 of the fourth embodiment from the third embodiment resides in that an external interface 41 serving as communication means to communicate the image pickup information output from the linear sensor 14 to the outside is provided in the housing 11 so as to be connected to the linear sensor 14. In this embodiment, the image pickup information from the linear sensor 14 is input to the external interface 41 through the signal processing means 31 and the storage means 32. As the external interface 41 may be used a communication circuit having RS232, 1349, USB, IRDA and a portable telephone function, an originally-standardized interactive or unidirectional communication circuit or the like.

The image input device 4 described above is provided with the external interface 41, and thus the image pickup information accumulated in the storage means 32 can be transmitted through the external interface 41 to the outside. Therefore, the image pickup information can be transferred from the storage means 32 through the external interface 41 to another storage medium or the like, so that the storage means 32 is allowed to store a large amount of information at all times. Further, even at a remote place, an image input from the image input device 4 can be transmitted and viewed.

The image input devices 1 to 4 of the above first to fourth embodiments may be provided with optical or electrical hand-movement correcting means for correcting the movement of hands. The optical hand-movement correcting means comprises a lens portion containing a lens 13 and an active prism installed in the lens 13, and a hand-movement detector. In the hand-movement correcting means thus constructed, the hand-movement is corrected by varying the refraction of the image pickup light L through the lens portion in accordance with the detection of the hand-movement in the hand-movement detector. The electrical hand-movement correcting means comprises a linear sensor 14 having a broader image pickup area than the effective angle of view corresponding to the image pickup information, and a hand-movement detector. The effective angle of view is moved in accordance with the detection of the movement of hands to correct the movement of hands.

Figure 8:
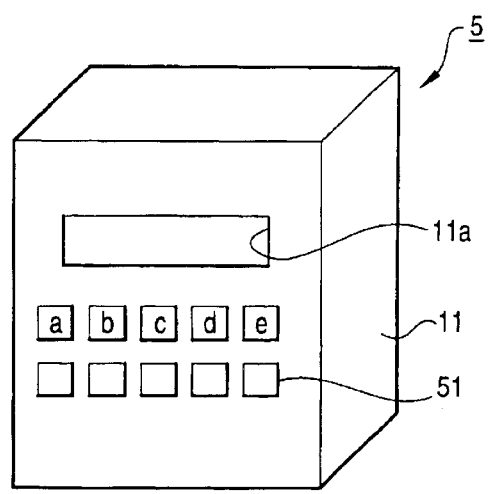
FIG. 8 is a perspective view showing a fifth embodiment of the image input device according to the present invention.
Figure 9:
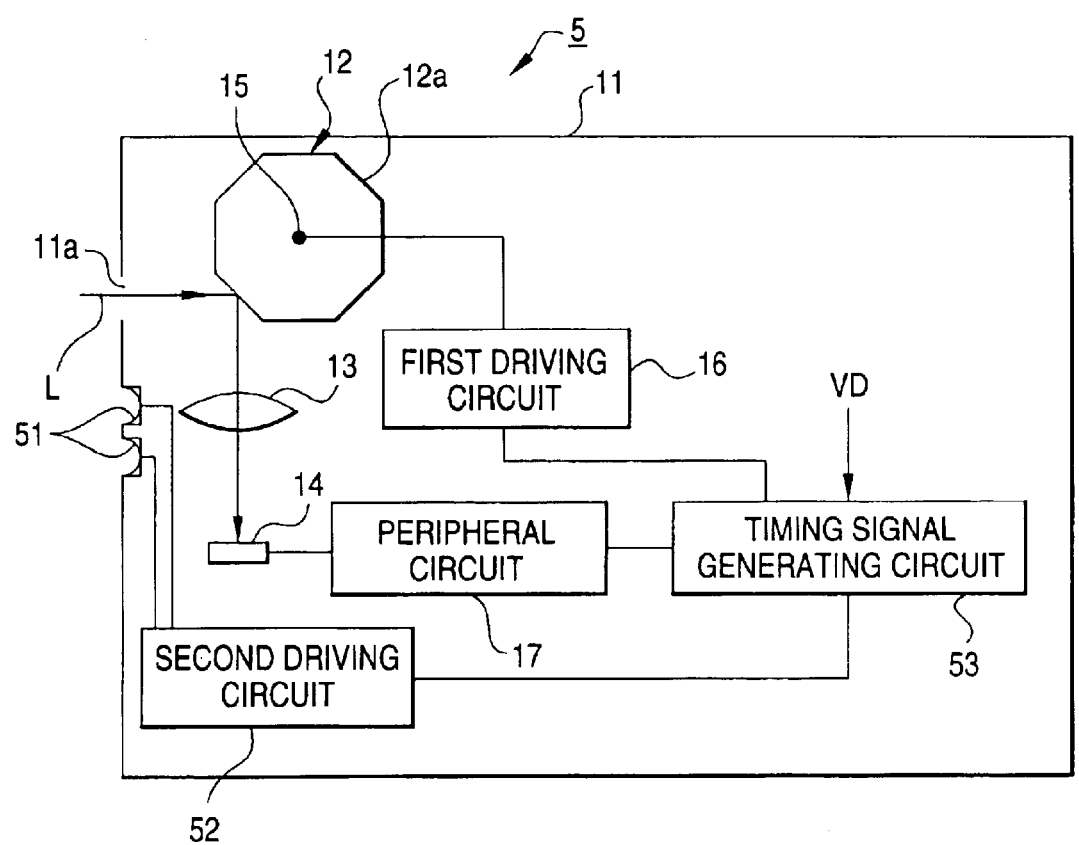
FIG. 9 is a diagram showing the construction of the fifth embodiment of the image input device according to the present invention.

Next, a fifth embodiment of the image input device according to the present invention will be described with reference to the perspective view of FIG. 8 and the schematic diagram of FIG. 9. In FIGS. 9 and 9, the same elements as the first embodiment are represented by the same reference numerals, and the description thereof is omitted.

The difference of the image input device 5 of the fifth embodiment resides in that a plurality of illuminators 51 which are successively turned on to light up to the subject are provided in the housing 11. In FIG. 8, a number of illuminators 51 are arranged on one surface of the housing 11 on which the incidence window 11a is provided. However, if illuminators can be alternatively turned on at high speed, only two illuminators 51 may be provided. Further, each illuminator 51 comprises an electronic flash such as a xenon lamp or the like.

A second driving circuit 52 serving as second driving means for successively turning on the illuminators 51 is provided in the housing 11. In addition, a first driving circuit 16 serving as first driving means for rotating the mirror body 12, a peripheral circuit 17 for driving the linear sensor 14, a second driving circuit 52 and a timing signal generating circuit (timing signal generating means) 53 for outputting timing signals to the first driving circuit 16, the peripheral circuit 17 and the second driving circuit 52 are provided in the housing 11.

The timing signal generating circuit 53 outputs the timing signals to the first driving circuit 16 and the second driving circuit 17 so that the illuminators 51 are turned on at a predetermined timing with respect to the rotation of the mirror body 12. In accordance with the timing signals, the first driving circuit 16 and the second driving circuit 17 serve to rotate the mirror body 12 and turn on the illuminators 51.

For example, the timing signal generating circuit 53 is supplied with a vertical synchronous signal (hereinafter referred to as VD signal). The timing signal generating circuit 53 outputs to the second driving circuit 52 a trigger pulse which is a timing signal for turning on the illuminators 51 in synchronism with the VD signal. The timing signal generating circuit 53 has a function of outputting to the first driving circuit 16 a timing signal for rotating the mirror body 12 in synchronism with the VD signal.

Figure 10:
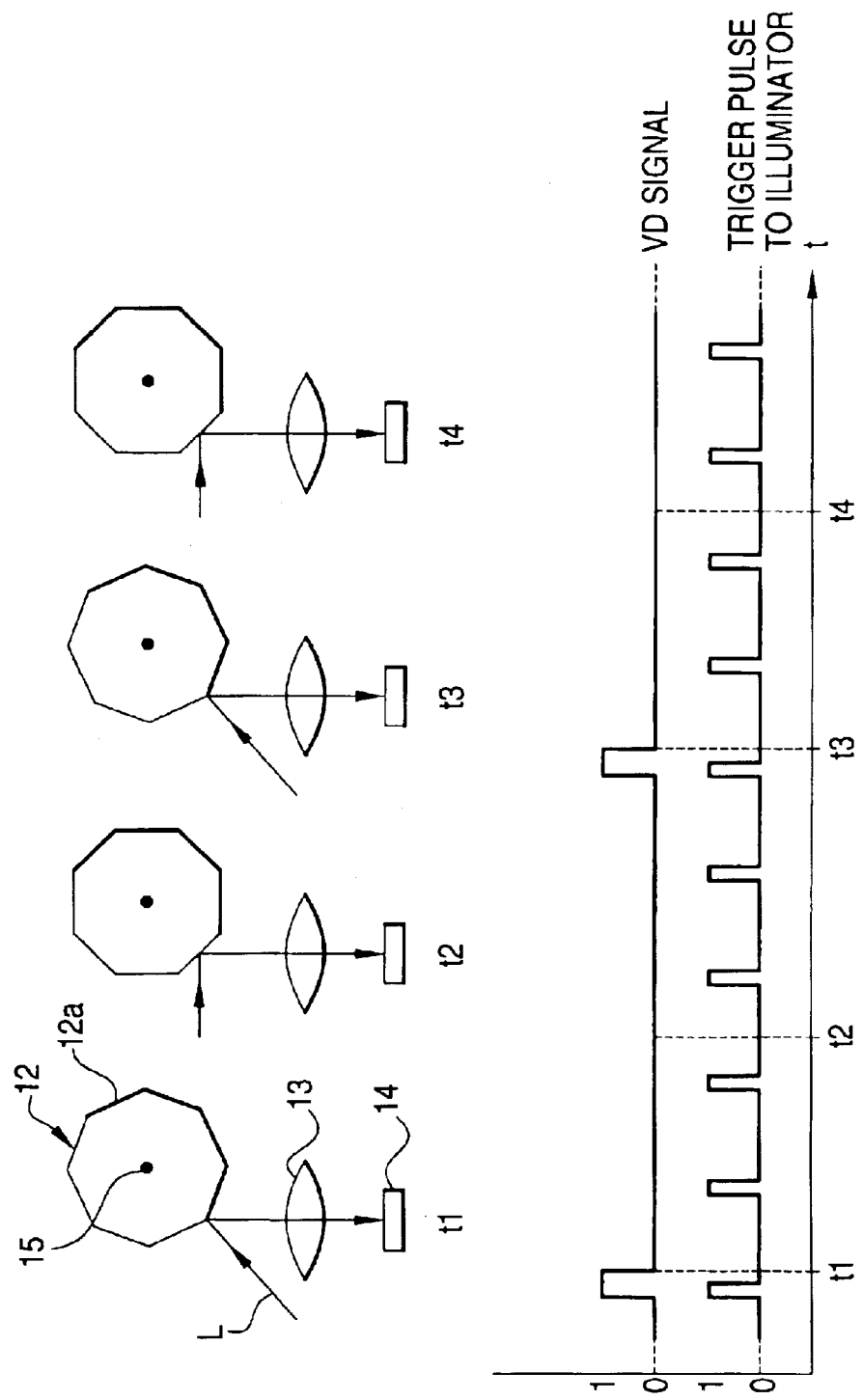
FIG. 10 is a timing chart showing an example of the timing relationship between a VD signal and a trigger pulse for turning on illuminators.

FIG. 10 is a timing chart showing an example of the timing relationship between the VD signal and the trigger pulse output to the second driving circuit 52. In this case, the trigger pulse is output from the timing signal generating circuit 53 to the second driving circuit 52 substantially simultaneously with input of the VD signal to the timing signal generating circuit 53.

The timing signal is output to the first driving circuit 16 so that the mirror body 12 is rotated at such a speed that the reflection of the image pickup light L is started and ended at one mirror face 12a of the mirror body 12, that is, one scan operation is completed during the time period from input of a VD signal until input of a next VD signal. Further, representing the start time point of the reflection of the image pickup light L at a mirror face 12a by $t_1$ and representing the start time point of the image pickup light L at an adjacent mirror face 12a by $t_3$, a trigger pulse is output to the second driving circuit 52 at an equal interval, for example at five times between $t_1$ and $t_3$ to successively turn on the illuminators 51.

Figure 11:
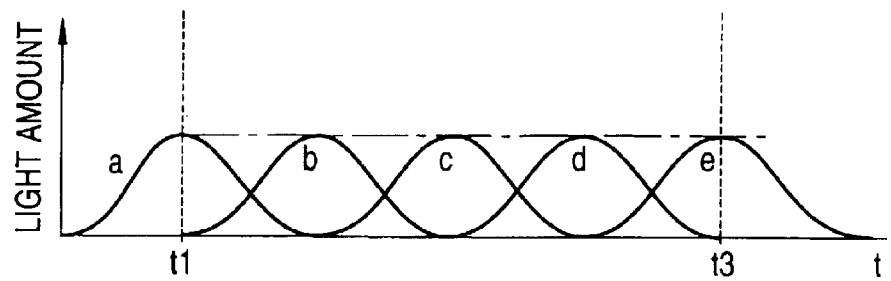
FIG. 11 is a diagram showing an example of a light amount distribution during one scan in the fifth embodiment.

As described above, in the image input device 5 of the fifth embodiment, a plurality of illuminators 51 which are successively turned on to light up to the subject are provided in the housing 11, and the illuminators 51 can be successively turned on when image pickup light L (of one scan) reflected from a mirror face is obtained. Representing a line of laterally-arranged illuminators 51 shown in FIG. 8 by a, b, c, d, e, the light amount of each of the illuminators 51 a to e varies like a Gaussian distribution as shown in FIG. 11, but the sum of the light amount can be set to a substantially fixed value by successively turning on the illuminators during one scan period (the sum is indicated by one-dotted chain line in FIG. 11). As a result, light can be substantially uniformed irradiated to the subject during one scan period.

Accordingly, although in the linear sensor 14 the accumulation time of the image pickup light L to be taken per scan is shorter as compared with the area sensor, the image pickup light L having a large accumulation amount can be obtained. Therefore, information of a clear and uniform two-dimensional image can be obtained under such an environment that a subject serving as a target is short of light amount, for example, under a dark three-dimensional space such as night or the like.

In the fifth embodiment, the illuminators, the first driving means, the second driving means, the timing signal generating means, etc. according to the present invention are installed into the image input device 1 of the first embodiment, thereby constructing the image input device 5. However, it is needless to say that the illuminators, etc. may be installed into the image input device 1 of the modification shown in FIG. 3, the image input device 2 of the second embodiment, the image input device 3 of the third embodiment or the image input device 4 of the fourth embodiment, thereby constructing the image input device which can provide clear and uniform two-dimensional image information even under a three-dimensional space which lacks light amount.

Figure 12:
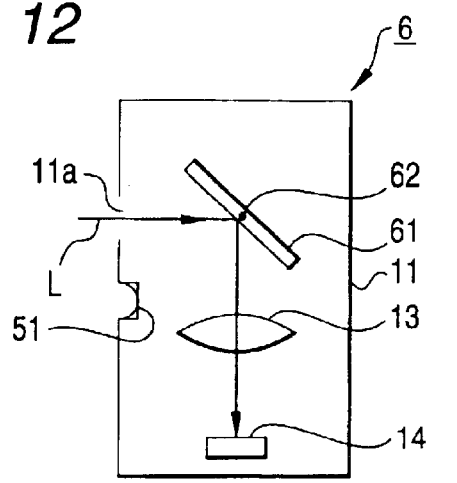
FIG. 12 is a diagram showing a first modification of the fifth embodiment.
Figure 13:
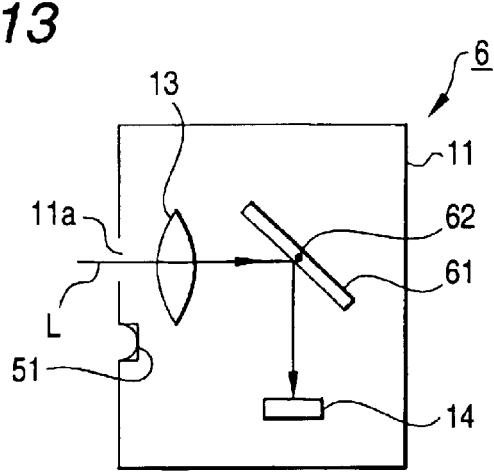
FIG. 13 is a diagram showing a second modification of the fifth embodiment.

Further, in place of using the mirror body having the polygonal prism form, the illuminators 51, etc. may be installed to an image input device 6 having a flat-plate type mirror body 61 as shown in a first modification of FIG. 12 and a second modification of FIG. 13. This mirror body 61 are formed of mirror face on one surface or both the surfaces thereof, and a shaft 62 is formed along the mirror face within the thickness of the mirror body 61. The mirror body 61 is supported by the shaft 62, and rotatable or swingable around the shaft 62. The incidence window 11a is formed so that the length direction thereof is substantially parallel to the shaft 62 of the mirror body 61. It is needless to say that clear and uniform two-dimensional image information can be obtained by even such an image input device 6.

As described above, according to the image input device of the first aspect of the present invention, the rotatable mirror body which has a polygonal prism shape and whose side peripheral surfaces are formed of mirror faces, and the linear sensor for taking the image pickup light reflected from each mirror face of the mirror body are provided, and two-dimensional image information can be obtained while the arrangement positions of these elements are fixed. Therefore, any precise moving mechanism for moving a linear sensor is not required, and thus the manufacturing cost can be reduced. Further, since the degree of freedom is provided to the distance between the subject and the image input device, two-dimensional image information can be obtained by targeting a three-dimensional space as a subject. Further, the mirror body is shaped into a polygonal prism shape, and if the subject is still, the two-dimensional image information of the same subject can be repetitively obtained. Therefore, a high-resolution still image can be obtained. Still further, if the subject has a motion, two-dimensional image information having continuous motions of the subject can be obtained, so that moving pictures can be obtained.

According to the image input device of the second aspect of the present invention, the two-dimensional image information can be obtained by providing the rotatable or swingable mirror body and the linear sensor, and thus the same effect as the first aspect of the present invention can be obtained. Further, the plural illuminators which are successively turned on to light up to the subject are provided in the housing in which the mirror body and the linear sensor are accommodated, and when image pickup light (of one scan) reflected from a mirror face is obtained, the illuminators are successively turned on irradiate uniform light to the subject. Therefore, clear and uniform two-dimensional image information can be obtained even under such an environment that a target subject lacks light amount, for example, under a dark three-dimensional space such as night or the like.

What is claimed is:

1. An image input device including:
a mirror body which is designed in a polygonal prism form and formed of mirror faces on the side peripheral surfaces thereof to reflect image pickup light from a subject at a mirror face;
a linear sensor for taking therein the image pickup light reflected from each mirror face of said mirror body and subjecting the image pickup light thus taken to photoelectric conversion, wherein said mirror body is disposed so that the length direction thereof is substantially parallel to the length direction of said linear sensor, and provided so as to be rotatable around the center of a plane which is substantially perpendicular to the length direction of said mirror body;
a housing in which said mirror body and said linear sensor are accommodated, and a slender incidence window for passing the image pickup light therethrough into said housing is formed so that the length direction thereof is substantially parallel to the length direction of said mirror body; and
support legs which are formed at the formation side of said incidence window of said housing so as to expand from said housing to the outside and support said housing, said support legs being retractably provided in said housing.

2. The image input device as claimed in claim 1, further including storage means for storing image pickup information output from said linear sensor.

3. The image input device as claimed in claim 1, further including communication means for communicating image pickup information output from said linear sensor to the outside.

4. The image input device as claimed in claim 1, wherein said linear sensor is constructed by a semiconductor image pickup element.

5. An image input device including:
a housing having a slender incidence window to pass image pickup light from a subject therethrough into said housing;
a mirror body which has mirror faces for reflecting the image pickup light from said incidence window and rotatably or swingably provided in said housing;
a linear sensor which is disposed in said housing and takes the image pickup light reflected from said mirror body to subject the image pickup light to photoelectric conversion;
a plurality of illuminators that are provided in said housing, wherein the illuminators are successively turned on during one scan period to light up the subject; and
an external interface located within the housing through which image pickup information is transmitted to the outside.

6. The image input device as claimed in claim 5, wherein said mirror body is designed in a polygonal prism form and formed of said mirror faces on all the side peripheral surfaces thereof, and disposed so that the length direction thereof is substantially parallel to the length direction of said linear sensor and provided so as to be rotatable around the center of the plane which is substantially perpendicular to the length direction of said mirror body, and wherein said incidence window is formed so that the length direction thereof is substantially parallel to the length direction of said mirror body.

7. The image input device as claimed in claim 5, wherein said mirror body is designed in the form of a flat plate, one face or both faces thereof being formed of said mirror faces, and a shaft is formed along said mirror faces so as to be located within said mirror body so that said mirror body is rotatable or swingable around said shaft, and wherein said incidence window is formed so that the length direction is substantially parallel to said shaft of said mirror body.

8. The image input means as claimed in claim 5, further including:

first driving means for rotating or swinging said mirror body;

second driving means for successively turning on said plural illuminators; and timing signal generating means for outputting timing signals to said first driving means and said second driving means so that said illuminators are successively turned on at a predetermined timing with respect to the rotational or swinging motion of said mirror body.

9. The image input device as claimed in claim 5, further including support legs which are formed at the formation side of said incidence window of said housing so as to expand from said housing to the outside and support said housing, said support legs being provided so as to be retractable into said housing or detachably mounted to said housing.

10. The image input device as claimed in claim 5, further including storage means for storing image pickup information output from said linear sensor.

11. The image input device as claimed in claim 5, wherein said linear sensor is constructed by a semiconductor image pickup element.

* * * * *

UNITED STATES PATENT AND TRADEMARK OFFICE
CERTIFICATE OF CORRECTION

PATENT NO. : 6,917,385 B1
DATED : July 12, 2005
INVENTOR(S) : Tadakuni Narabu

It is certified that error appears in the above-identified patent and that said Letters Patent is hereby corrected as shown below:

<u>Title page,</u>
Item [57], ABSTRACT,
Line 5, "talking" should read -- taking --.

Signed and Sealed this

Fourth Day of April, 2006

JON W. DUDAS
*Director of the United States Patent and Trademark Office*